June 25, 1957   J. M. CALLAN   2,797,386
METAL TESTING EQUIPMENT
Filed Oct. 1, 1953

INVENTOR
JOSEPH M. CALLAN
BY
ATTORNEYS

United States Patent Office 2,797,386
Patented June 25, 1957

2,797,386
METAL TESTING EQUIPMENT

Joseph M. Callan, Jackson Heights, N. Y., assignor to Magnetic Analysis Corporation, Long Island City, N. Y., a corporation of New York Application October 1, 1953, Serial No. 383,653

13 Claims. (Cl. 324—34)

This invention relates to non-destructive testing, and is directed especially to electro-magnetic testers for use with magnetic and non-magnetic conductive materials.

The equipment of the present invention operates on the "core-loss" principle and is adapted to test for hardness, grade, heat differences, heat treatment, decarburization and case hardness, sheet thickness, and plating or cladding thickness, as well as for cracks, seams and other flaws in objects of a large variety of forms and dimensions. The instrument is simple to operate and to maintain, is unusually sensitive, rugged and reliable and being of small dimensions and weight is readily portable.

An understanding of the invention will be had from the following description considered in connection with the drawing in which Fig. 1 is a circuit diagram of the equipment of the invention;

Figure 1:
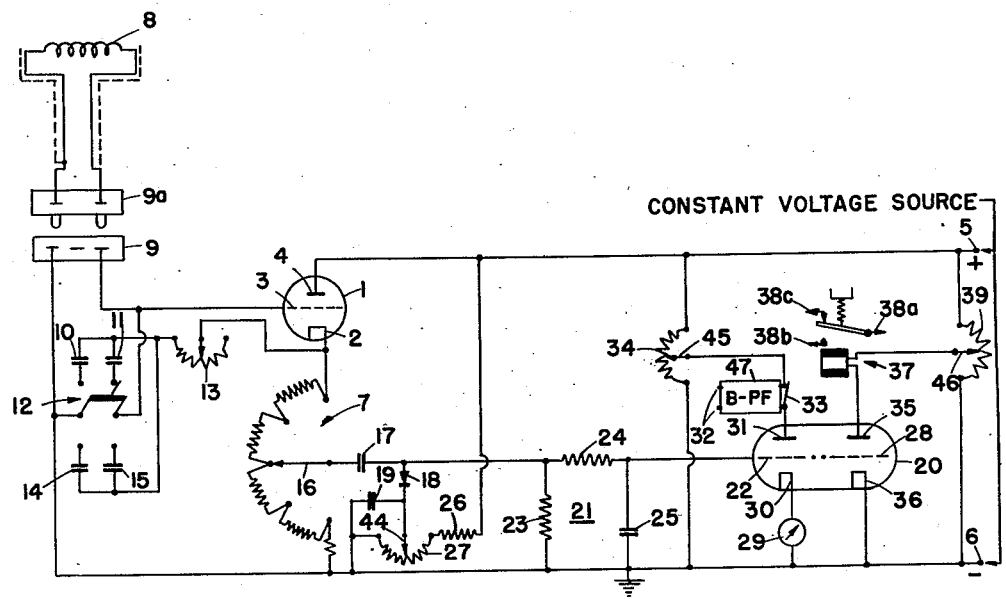

Referring now to Fig. 1, the oscillator of the equipment comprises a vacuum tube 1, such as type 6SN7, having a cathode 2, a grid 3 and a plate 4. This tube being of the twin-triode type the pairs of like electrodes are connected together. A suitable source of direct-current voltage is assumed to be connected between terminals 5 and 6 which are connected respectively to the plate and to ground. This voltage source should be well regulated so as to be substantially constant under operating conditions. Since such plate voltage sources are well known this voltage source need not here be further described.

Instead of being connected directly to ground, the cathode 2 is connected to ground through a tapped cathode resistor 7 across which the oscillation voltage is developed. Thus this tube is connected after the manner of a cathode follower, but in this case it comprises an oscillator by virtue of a feedback path from the cathode to the resonant grid circuit, described below.

Connected to the grid 3 is a probe test coil 8 of which the high-potential terminal is directly connected to the grid through one prong of a separable connector 9, 9a. The low-potential terminal of coil 8 is connected through another prong of the connector to ground. Connected across the terminals of coil 8 is a capacitance comprising two condensers 10 and 11 connected in series. These condensers may for example have a capacity of .002 mfd., each, and they will be connected as described when switch 12 is thrown in the upward position as shown in the drawing. The mentioned feedback path includes variable resistor 13 which is connected from cathode 2 to the junction of condensers 10 and 11, which is equivalent to a connection to a tap on coil 8. Resistor 13 may be of approximately 10,000 ohms and should be calibrated. Preferably this resistor is of the precision type having a manual control and a dial calibrated to three significant figures. One such type is known as "Helipot." Adjustment of resistor 13 varies the amplitude of oscillations in the output of this oscillator, but the plate current remains substantially constant.

Condensers 14 and 15, which correspond respectively to condensers 10 and 11, are connected in circuit in place of condensers 10 and 11 when switch 12 is thrown to the downward position as shown in the drawing. In the particular embodiment herein described, condensers 14 and 15 may each be of .02 mfd., so that when the switch is thrown down the oscillation frequency will be lower than when the switch is thrown to the up position. In the embodiment herein described these frequencies would be, say, 10 kc. and 30 kc. approximately, depending upon the inductance of the coil 8. Any frequencies within the range of 1 kc. and 100 kc. would be suitable. If more than two operating frequencies are required an appropriate selector switch and condensers of additional capacities can be provided, or condenser structures may be substituted which in themselves provide for adjustable capacity ranges.

The output circuit of tube 1, being of cathode follower type, includes resistor 7 which in this case should be of the tapped or potentiometer type. Here five different resistance values are provided by taps and an adjustable contact element, although the value of the cathode resistor per se, is constant. In the illustrated embodiment these taps include resistors of the following values as they appear connected from the cathode to ground: 610, 390, 390, 390 and 510 ohms, respectively. The adjustable element 16 of this resistor is connected to a rectifier circuit which includes in series connection, condenser 17, crystal rectifier 18 and condenser 19 which, in turn, is connected to ground. Thus by manipulation of element 16 various magnitudes of oscillator output voltage may be impressed on the rectifier. The output of the rectifier is coupled to the input of amplifying vacuum tube 20 through a filter 21 which smoothes out the unidirectional pulses from the rectifier so that the potential impressed upon the first grid 22 of the amplifier comprises variations of direct current which are approximately proportional to the amplitude of the high-frequency oscillations. In this embodiment the resistors 23 and 24 are of 100,000 ohms each and condenser 25 is of .05 mfd.

Connected to the rectifier 18 is a rectifier biasing circuit which includes resistor 26 and potentiometer 27 connected in series between the positive terminal 5 and negative terminal 6 of the voltage source. Any other suitable voltage source could be used. The variable element or slider 44 of potentiometer 27 is connected between rectifier 18 and condenser 19 so that by adjusting this slider any desired predetermined bias may be applied to the rectifier. This is desirable especially in order to duplicate the performance of the equipment following the substitution of rectifier units. It has been found that the characteristics especially of crystal rectifiers, even of the same type, vary and that these can be compensated for by suitable bias adjustment. Resistor 26 may be of 250,000 ohms and potentiometer 27 of 25,000 ohms.

Amplifier tube 20, being connected to operate as a D. C. amplifier, provides a variation in output or plate current in proportion to the variations in D. C. potential impressed on its first grid 22. The same potential variations are simultaneously impressed on the second grid 28 of the same tube since this tube is, as shown, of the twin-triode type such as 6SN7. The plate current of the first section of tube 20 is measured by micro-ammeter 29 connected between cathode 30 and ground and which may have a range of say 0 to 500 micro-amperes. Connected across the contacts of switch 33 between the first plate 31 and the positive terminal 5 of the plate-voltage source is a suitable band-pass filter 47. Terminals 32 of the filter are adapted to be connected to an oscilloscope or to some other measuring instrument or indicating device such as a neon tube. The filter 47 should have a pass band from just below the oscillator frequency to 100 or less cycles per second. An audio-frequency transformer may sometimes serve. This filter is useful only when the test involves relative motion between the test coil and the object under test. When switch 33 is open the external indicating device will then respond only to plate-current fluctuations of which the frequency components are within the minimum and maximum pass frequencies of the filter. The manner in which it may be used is described below. A potentiometer 34 is connected across the plate voltage supply with the slider 45 connected to the plate 31 through switch 33. By adjustment of this potentiometer, which may have a resistance of say 100,000 ohms, the magnitude of plate current suitable under the conditions of the measurement may be preselected.

The second section of tube 20 which includes grid 28, plate 35 and cathode 36, receives the same signals as those impressed on grid 22. In the plate circuit of this second section a sensitive relay 37, which may be of the "Sigma" type, is connected for the purpose of controlling any desired external mechanism. For example, in connection with the testing of a large number of similar articles or parts, a sorting device may be provided to separate articles passed from articles rejected. Such a device may readily be connected to contacts 38a, 38b and 38c to provide automatic sorting. The threshold current in the circuit of plate 35 at which it is desired that relay 37 be operative, may be adjusted by slider 46 on potentiometer 39 which is connected in a manner similar to that of potentiometer 34. In this embodiment potentiometer 39 is of 25,000 ohms.

As above suggested, a neon tube has been found to be frequently useful as an indicator, especially of flaws, because of its substantially instantaneous operation. Many flaws as they pass the probe or pass through a test coil provide a signal of such a short duration that an indicating meter such as the micro-ammeter 29, if it indicates at all, may give a very inconspicuous or inaccurate response. However the neon tube if suitably biased so as to light only when actuated by a sharp signal pulse, will respond clearly to narrow or small flaws. If desired, a plurality of neon tubes may be connected in parallel, but with different biasing voltages so that one tube will indicate one type of flaw and another tube, or two tubes together, will indicate another type of flaw.

Other signaling means are likewise useful in connection with the invention. For example, the indications observable on an oscilloscope screen are informative, especially when a probe is employed to scan the entire surface of the object to be examined, for example the cylindrical external surface of metal tubing, as it passes the probe while the object, or the probe, is rotated. Thus the probe covers the entire surface of the tubing by following a helical path thereon. If the horizontal deflection of the oscilloscope beam is timed to be in synchronism with each revolution of the object, or of the probe, the position of the flaw along the horizontal axis of the object may be determined. Alternatively the tubing, bar stock or the like, may be arranged to pass through a cylindrical test coil, in which case it need not be rotated.

Figures 2, 3:
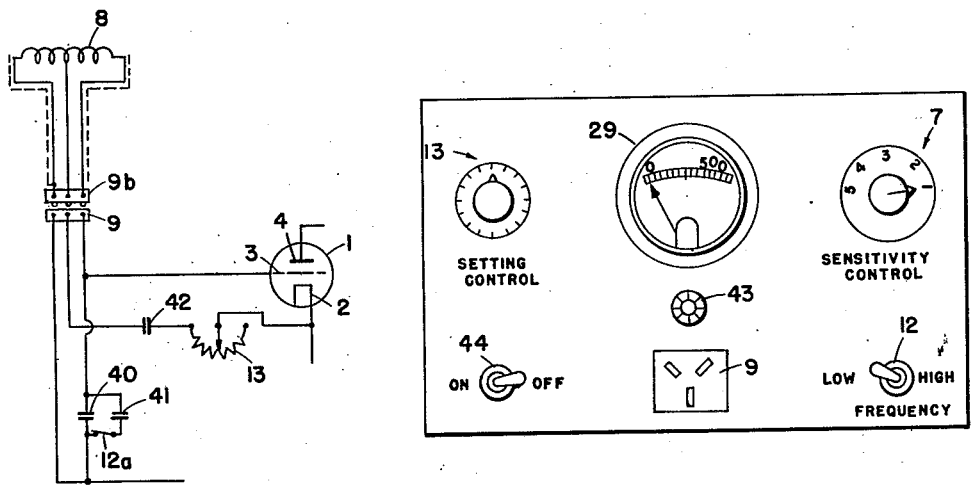
Fig. 2 is an alternative modification of a portion of Fig. 1.
Fig. 3 is a front view of the control panel of the instrument.

The modification illustrated in Fig. 2 is functionally equivalent to that of Fig. 1, but differs therefrom specifically in that the feedback path is connected from cathode 2 to a center tap on coil 8 instead of to a corresponding midpoint between two similar condensers connected across the coil. It is not essential that the tap be at the midpoint, however. In this case it is necessary to provide but a single condenser 40 connected in shunt to coil 8. To provide the same frequency as in the embodiment of Fig. 1, condenser 40 may be of .001 mfd. The capacity of condenser 40 may be increased to provide a lower oscillation frequency by closing switch 12a which connects condenser 41 in parallel. Hence to provide a comparable low oscillation frequency, condenser 41 may be of .009 mfd. Any other of several well-known means for changing the capacity of condenser 40 may be employed. Condenser 42 is for blocking direct-current and may have a capacity of, say, 0.1 mfd. In all other respects the circuits of Fig. 1 and Fig. 2 are the same and they may be expected to operate substantially alike.

Referring now to Fig. 3, the various controls above referred to are illustrated in an arrangement which by experience has proved to be convenient. In this drawing the potentiometer 13 is represented by its control knob and calibrated dial designated "setting control." Adjustable resistor 7 is represented by the control knob and its five indexed positions designated as "sensitivity control." Micro-ammeter 29 is represented at the central top portion of the panel, and separable connector 9 at the lower central portion. Between the two is an indicator lamp 43 which is not shown in the circuit diagram but which is connected to the power input controlled by power switch 44 (also omitted from the diagram) so as to indicate when the power to the entire equipment is on and off. Switch 12, which in the illustrated embodiments provides for two different oscillation frequencies, is represented in the lower right-hand corner of the figure.

The test coil 8 referred to in connection with Figs. 1 and 2, in the embodiments illustrated, connected through the separable connector 9, one-half of which is illustrated in Fig. 3. Connections to terminals 32 for an external oscilloscope or neon tube and to contacts 38a, b, c, for the sorting or other apparatus operated by relay 37, are provided for at the rear of the equipment which is not illustrated.

The test coil 8 may have a wide range of dimensions depending primarily on the nature of the articles to be tested as well as on the nature of the properties, characteristics, or flaws which are to be detected or measured. In any case they may be simple in construction and, over the frequency range contemplated in connection with the mentioned embodiment, the coil may comprise any suitable number of turns of small, insulated wire, regardless of the general physical dimensions of the coil. Coils of approximately 1,000 turns have been successfully employed. For instance, in testing or exploring surfaces of metallic objects a probe coil having comparatively small end dimensions is preferable in order to minimize the area tested at each location of the probe.

Figure 4:
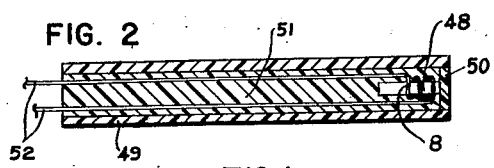
Fig. 4 illustrates in cross-section a test probe of a type suitable for use in connection with the invention.

Referring to Fig. 4, a typical probe coil 8 of, say, 1,000 turns is wound on an inner core or barrel 48. Although a magnetic core is not essential, it has been found to be preferable because it permits the coil to be smaller and provides higher efficiency. Hence, a core of "Ferrite" approximately 3/32 of an inch in diameter and 1/2 inch long may be disposed within the coil which is encased in a closed plastic cylinder 49 approximately 1/2 inch in diameter and 3 inches long so that the coil and core are close to one closed end 50 of the cylinder. The remaining space may be filled, as is customary, with a suitable plastic filler 51 which protects the core and winding. The remainder of the 3-inch cylinder provides a handle through which shielded leads 52 extend to the connector 9a (Fig. 1) or 9b (Fig. 2). Thus when the flat end 50 of such a probe is pressed against the surface of a metal part to be tested, one end of the "Ferrite" core is spaced by the thickness of the plastic (approximately 1/16 of an inch) from the surface and this induces circulating currents on the surface of the metal part which affect the flux in the core and hence alter the losses in the oscillator system. The result is that the amplitude of the output oscillations changes in a manner related to the change in the characteristics or condition of the material under test and this change appears either as a change in the indication of meter 29 or of the mentioned oscilloscope or neon tube connected to terminals 32, or of the sorting or other appropriate device connected to be operated by relay 37, or both.

In some cases it is desired that instead of scanning the surface of the object by a probe, the entire object be tested at once. In this event the test coil (also of approximately 1,000 turns) may be wound in cylindrical form having an opening in the middle, viz. an air core. Coils having inside diameters of from ½ inch to 3 inches have been successfully employed. In this opening the entire article or articles may be inserted, or may be arranged to pass through the coil in continuous procession, in accordance with practice well-known in the art.

*Adjustment and operation*

The metal testing equipment as above described may be adjusted and operated in the following manner. After the power has been turned on by means of the power switch (44, Fig. 3) and the apparatus given an opportunity to warm up, the sensitivity control 7 is set at position 5 for maximum sensitivity. Switch 12 may then be thrown to the "High" position and a sample of the objects to be tested placed in the center of a test coil, or a test probe may be held against a given surface to be tested. If meter 29 then reads 0, the setting control 13 should be turned in a direction to increase the resistance until the meter reads midscale, viz. 250. If the meter cannot be made to read above 0, a smaller test coil should be substituted. On the other hand if the meter reads near the top of the scale, setting control 13 should be turned in the opposite direction, viz. to decrease the resistance, until the meter reads midscale. Conversely if the meter cannot be made to read less than full scale, then the use of a larger test coil is indicated.

The object to be tested is then replaced with several other similar objects inserted one at a time in exactly the same manner and the meter reading taken for each object noting whether there is any difference in the meter readings for the different objects. If there is a difference in the readings, then the objects should be compared to determine whether their physical differences are consistent with the differences in the readings. If they are consistent, then the setting control 13 should be adjusted to obtain the most convenient meter setting (about midscale), after which all of the objects may be tested on a production basis. After the adjustments have been made as above described, variations in meter readings resulting from the introduction of different metallic objects in or to the test coil can be taken as a measure of "core loss" and hence as a measure of departure from standard. A more accurate measurement can be made by reversing the procedure, viz., by turning the dial 13 until the meter reading is brought back to normal (in this example, 250) and then reading the number of degrees by which the dial has been moved. However, this procedure is obviously more time consuming, and in most cases is unnecessarily accurate.

It is advisable periodically, for example every quarter hour, to test as a "standard" the sample object previously selected, in order to check the operation of the instrument. If any drifting has occurred, the instrument can be reset or recalibrated using the "standard" object and adjusting control 13 until meter 29 returns to its normal reading, here assumed to be the midpoint of its scale.

Occasionally during the initial adjustment of the equipment it is found that the desired meter deflection or the desired operation of relay 37 cannot be obtained with the use of the high frequency setting. In this event throwing switch 12 to the low frequency position will usually permit satisfactory operation if the steps above outlined are followed.

As above pointed out, although the equipment in accordance with this invention is simple in construction, it is nevertheless extremely sensitive. In order to ascertain whether the instrument is adjusted for normal sensitivity, the following check may be made: With the sensitivity control 7 set for maximum sensitivity, viz. with the adjustable element 16 (Fig. 1) at the uppermost contact, and with the frequency switch 12 thrown to the "high" position, the setting control 7 is adjusted until the meter reads 250. If the meter cannot be brought up from 0, then a piece of metal should be inserted in or adjacent the test coil, after which the setting control should be turned to the left, decreasing resistance 13, until the meter reads 50, noting the dial reading of the setting control. Next, the setting control should be turned to the right until the meter reads 450, again noting its reading. If the difference of the two readings of the setting control is less than 25 divisions out of the maximum of 1,000, the equipment is operating with normal sensitivity.

I claim:

1. In metal testing apparatus including a vacuum tube oscillator having the characteristics that the direct plate current is substantially constant and that the output variations are substantially only of oscillation amplitude, said oscillator comprising a vacuum tube having a cathode and grid and plate electrodes, means for connecting a source of substantially constant plate potential between said plate and ground, a test coil having high-potential and low-potential terminals and shunt capacitance connected thereto so as to form with said coil a resonant circuit having two reactive branches, a connection from the high-potential terminal of said coil to said grid, a feedback path including an adjustable resistor connected from said cathode to an intermediate point in one of said reactive branches by which the oscillation amplitude is controllable, a connection from the low-potential terminal of said coil to ground, a cathode resistor connected between said cathode and ground across which an oscillation voltage is established, and oscillation-amplitude responsive means coupled across at least a portion of said cathode resistor.

2. In metal testing apparatus including a vacuum tube oscillator having the characteristics that the direct plate current is substantially constant and that the output variations are substantially only of oscillation amplitude, said oscillator comprising a vacuum tube having a cathode and grid and plate electrodes, means for connecting a source of substantially constant plate potential between said plate and ground, a test coil having high-potential and low-potential terminals and shunt capacitance connected thereto so as to form with said coil a resonant circuit having two reactive branches, a connection from the high-potential terminal of said coil to said grid, a feedback path including an adjustable resistor connected from said cathode to an intermediate point in one of said reactive branches by which the oscillation amplitude is controllable, a connection from the low-potential terminal of said coil to ground, a cathode resistor connected between said cathode and ground across which an oscillation voltage is established, an adjustable output tap on said cathode resistor, a rectifier coupled to said tap and thereby to a selectable portion of said cathode resistor, a direct-current amplifier coupled to the output of said rectifier, and signalling means connected to the output of said amplifier responsive to variations in the amplifier output current.

3. In metal testing apparatus including a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil having high-potential and low-potential terminals and shunt capacitance connected thereto so as to form with said coil a resonant circuit, a connection from the high-potential terminal of said coil to said grid, a feedback path including an adjustable resistor connected from said cathode to a point in said circuit intermediate said terminals, a connection from the low-potential terminal of said coil to ground, a sub-dividable cathode resistor connected between said cathode and ground across which an oscillation voltage is established, a rectifier coupled between a selectable portion of said cathode resistor and ground, a potentiometer connected across said source of plate potential and having an adjustable element connected to said rectifier for impressing a variable bias potential thereon, a direct-current amplifier coupled to the output of said rectifier, and signalling means connected to the output of said amplifier responsive to variations in the amplifier output current.

4. In metal testing apparatus including a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil having high-potential and low-potential terminals and shunt capacitance connectable thereto so as to form with said coil a resonant circuit, said resonant circuit comprising a plurality of condensers and switching means for selectively connecting said condensers to said coil to change the resonant frequency of said circuit, a connection from the high-potential terminal of said coil to said grid, a feedback path including an adjustable resistor connected from said cathode to a point in said circuit intermediate said terminals, a connection from the low-potential terminal of said coil to ground, a sub-dividable cathode resistor connected between said cathode and ground across which an oscillation voltage is established, a rectifier coupled to a selectable portion of said cathode resistor, a direct-current amplifier coupled to the output of said rectifier, and signaling means connected to the output of said amplifier responsive to variations in the amplifier output current.

5. In metal testing apparatus including a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, adjustable capacitance connected across said coil to form a resonant circuit of adjustable frequency, a feedback path including a calibrated adjustable resistor connected from said cathode to the midpoint of said capacitance, a rectifier connected between an adjustable contact on said cathode resistor and ground, an amplifier of the D. C. type, filter means coupling the output of said rectifier to the input of said amplifier, and signaling means connected to the output circuit of said amplifier so as to be actuated in response to variations in the output current thereof.

6. In metal testing apparatus including a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, a pair of similar condensers connected in series across said coil, a feedback path including a calibrated adjustable resistor of precision type connected from said cathode to the junction between said condensers, means for changing the capacity values of said condensers to like extent, a rectifying circuit connected between an adjustable contact on said cathode resistor and ground, said rectifying circuit including in the order named a condenser, a rectifier and a second condenser, an amplifier of the D. C. type, filter means coupling the output of said rectifier to the input of said amplifier, and signaling means connected to the output circuit of said amplifier so as to be actuated in response to variations in the output current thereof.

7. In metal testing apparatus including a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, a pair of similar condensers connected in series across said coil, a feedback path including a calibrated adjustable resistor of precision type connected from said cathode to the junction between said condensers, switch means for changing the capacity values of said condensers to like extent, a rectifying circuit connected between an adjustable contact on said cathode resistor and ground, said rectifying circuit including in the order named a condenser, a rectifier and a second condenser, a biasing circuit for said rectifier comprising a potentiometer connected across a source of substantially constant D. C. potential and having a variable element connected to the junction of said rectifier and said second condenser, an amplifier of the D. C. type, filter means coupling the output of said rectifier to the input of said amplifier, and signaling means connected to the output circuit of said amplifier so as to be actuated in response to variations in the output current thereof.

8. Metal testing apparatus including a vacuum tube oscillator having the characteristics that the plate current thereof is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, a condenser connectible across said coil to form a resonant circuit therewith, means for changing the value of said condenser and thereby the frequency of said circuit, a feedback path including a condenser and a calibrated adjustable resistor of precision type connectible in series between said cathode and an intermediate tap on said coil, a rectifier connected between an adjustable contact on said cathode resistor and ground, an amplifier of the D. C. type, filter means coupling the output of said rectifier to the input of said amplifier, and signaling means connected to the output circuit of said amplifier so as to be actuated in response to variations in the output current thereof.

9. In metal testing apparatus including a vacuum tube oscillator having the characteristics that the plate current thereof is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, a condenser connectible across said coil to form a resonant circuit therewith, means for changing the value of said condenser and thereby the frequency of said circuit, a feedback path including a condenser and a calibrated adjustable resistor of precision type connectible in series between said cathode and the midpoint of said coil, a rectifying circuit connected between an adjustable contact on said cathode resistor and ground, said rectifying circuit including in the order named a condenser, a rectifier and a second condenser, a biasing circuit for said rectifier comprising a potentiometer connected across a source of substantially constant D. C. potential and having a variable element connected to the junction of said rectifier and said second condenser, an amplifier of the D. C. type, filter means coupling the output of said rectifier to the input of said amplifier, and signaling means connected to the output circuit of said amplifier so as to be actuated in response to variations in the output current thereof.

10. In testing apparatus including a test coil adapted to be disposed in electro-magnetic and moving relation to conductive material to be tested, a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil having high-potential and low-potential terminals and shunt capacitance connected thereto so as to form with said coil a resonant circuit, a connection from the high-potential terminal of said coil to said grid, a feedback path including an adjustable resistor connected from said cathode to a point in said circuit intermediate said terminals for adjusting the oscillation amplitude, a connection from the low-potential terminal of said coil to ground, a sub-dividable cathode resistor connected between said cathode and ground across which an oscillation voltage is established, a rectifier coupled to a selectable portion of said cathode resistor, a direct-current amplifier coupled to the output of said rectifier, band-pass filter means connected to the output of said amplifier, said filter means being proportioned to pass a band of signal frequencies all of which are lower than the frequency of said oscillator, and an indicating device connected to the output of said filter means responsive to variations in amplitude of the signals passed by said filter.

11. In testing apparatus including a test coil adapted to be disposed in electro-magnetic and moving relation to conductive material to be tested, a vacuum tube oscillator having the characteristics that the plate current is substantially constant and that the output variations are of oscillation amplitude, said oscillator comprising a vacuum tube having a cathode and grid and plate electrodes, means for connecting a source of substantially constant plate potential between said plate and ground, a test coil connected between said grid and ground, a tapped cathode resistor connected between said cathode and ground, a pair of similar condensers connected in series across said coil, a feedback path including a calibrated adjustable resistor of precision type connected from said cathode to the junction between said condensers for adjusting the oscillator amplitude, means for changing the capacity values of said condensers to like extent, a rectifying circuit connected between an adjustable contact on said cathode resistor and ground, said rectifying circuit including in the order named a condenser, a rectifier and a second condenser, a biasing circuit for said rectifier comprising a potentiometer connected across a source of substantially constant D. C. potential and having a variable element connected to the junction of said rectifier and said second condenser, an amplifier of the D. C. type, filter means coupling the output of said rectifier to the input of said amplifier, band-pass filter means connected to the output of said amplifier, said band-pass filter means being proportioned to pass a band of signal frequencies all of which are lower than the frequency of said oscillator, and an indicating device connected to the output of said band-pass filter means responsive to variations in amplitude of the signals passed by said band-pass filter means.

12. In metal testing apparatus including a vacuum tube oscillator of cathode follower type having the characteristics that the direct plate current is substantially constant and that the output variations are substantially only of oscillation amplitude, said oscillator comprising a vacuum tube having a cathode and grid and plate electrodes, means for connecting a source of substantially constant plate potential between said plate and ground, a test coil having terminals connected between said grid and ground, a tapped cathode resistor connected between said cathode and ground, adjustable capacitance connected across the terminals of said coil to form a resonant circuit of adjustable frequency, a feedback path including an adjustable resistor connected from said cathode to a point in said resonant circuit of intermediate impedance with respect to said terminals, a rectifier connected between an adjustable tap on said cathode resistor and ground, a direct-current amplifier coupled to the output of said rectifier, and signaling means connected to the output circuit of said amplifier so as to be actuated in response to variations in the output current thereof and thereby to respond to variations in amplitude of the output of said oscillator.

13. In metal testing apparatus including a vacuum tube oscillator of cathode follower type having the characteristics that the direct plate current is substantially constant and that the output variations are substantially only of oscillation amplitude, said oscillator comprising a vacuum tube having a cathode and grid and plate electrodes, means for connecting a source of substantially constant plate potential between said plate and ground, a test coil having terminals connected between said grid and ground, a tapped cathode resistor connected between said cathode and ground, adjustable capacitance connected across the terminals of said coil to form a resonant circuit of adjustable frequency, a feedback path including an adjustable resistor connected from said cathode to a point in said resonant circuit of intermediate impedance with respect to said terminals, a rectifier connected between an adjustable tap on said cathode resistor and ground, and coupling means for coupling a signal responsive device to the output circuit of said rectifier, said coupling means having the characteristic that it restricts the signal output from said rectifier to be representative substantially only of variations in amplitude of said oscillator.

References Cited in the file of this patent

UNITED STATES PATENTS

| | | |
|---|---|---|
| 2,267,884 | Zuschlag | Dec. 30, 1941 |
| 2,352,219 | Olesen | June 27, 1944 |
| 2,576,173 | Cornelius | Nov. 27, 1951 |
| 2,632,853 | Lindley | Mar. 24, 1953 |